US012077995B2

(12) United States Patent
Ney et al.

(10) Patent No.: US 12,077,995 B2
(45) Date of Patent: Sep. 3, 2024

(54) SIDE DOOR LATCH

(71) Applicant: Inteva Products, LLC, Troy, MI (US)

(72) Inventors: Daniel Alexander Ney, Lake Orion, MI (US); Hector Sanchez, Cd. Juarez (MX); Eduardo Estrada, Cd. Juarez (MX); Carlos Issac Tostado Bocanegra, Cd. Juarez (MX); Miguel Angel Baray, Cd. Juarez (MX); Jesus Osvaldo Alvarez Morales, Cd. Juarez (MX); Pedro Alfredo Alvarado Heredia, Cd. Juarez (MX); Donald Michael Perkins, Warren, MI (US)

(73) Assignee: INTEVA PRODUCTS, LLC, Troy, MI (US)

(*) Notice: Subject to any disclaimer, the term of this patent is extended or adjusted under 35 U.S.C. 154(b) by 0 days.

(21) Appl. No.: 17/395,212

(22) Filed: Aug. 5, 2021

(65) Prior Publication Data

US 2022/0042352 A1 Feb. 10, 2022

Related U.S. Application Data

(60) Provisional application No. 63/194,980, filed on May 29, 2021, provisional application No. 63/061,563, filed on Aug. 5, 2020.

(51) Int. Cl.
*E05B 81/06* (2014.01)
*E05B 81/16* (2014.01)
(Continued)

(52) U.S. Cl.
CPC .............. *E05B 81/06* (2013.01); *E05B 81/16* (2013.01); *E05B 81/20* (2013.01); *E05B 81/90* (2013.01)

(58) Field of Classification Search
CPC .......... E05B 81/06; E05B 81/14; E05B 81/16; E05B 81/18; E05B 81/20; E05B 81/25;
(Continued)

(56) References Cited

U.S. PATENT DOCUMENTS 6,053,542 A 4/2000 Ostrowski et al.
6,341,448 B1 * 1/2002 Murray .................. E05B 81/20 49/283

(Continued)

FOREIGN PATENT DOCUMENTS

EP 3321456 A1 * 5/2018 ............... B60N 2/20
EP 3660249 A1 6/2020
WO WO-2020071651 A1 * 4/2020 ............ B60J 5/0416

OTHER PUBLICATIONS

Swedish Office Action for Application No. 2150986-4 Issued Mar. 4, 2022, 8 Pages.

(Continued)

*Primary Examiner* — Kristina R Fulton
*Assistant Examiner* — Noah Horowitz
(74) *Attorney, Agent, or Firm* — CANTOR COLBURN LLP

(57) ABSTRACT

A remote cinching actuator, which includes an integral motor wherein its rotation will drive the two stage drive gears system, that are coupled to a cable lever. This cable lever is mechanically attached to a cinch lever within the side door latch by the cable. The lever will rotate on its pivot and move the cinch drive link. A bearing attached to the cinch drive link will move during the cinching operation, traveling through a canal of a cinch override lever, to maintain the traveling course of the cinch drive link and, thereby, allowing the interaction between the cinch drive link and a claw to rotate the claw to its closed/primary position. A vehicle side door latch, including an integral motor and a power release gear for performing a power
(Continued)

release function of the latch wherein the rotation of the motor in a power release direction will drive the power release gear which in turn will hit a power release lever to move the pawl release lever, so that the former can interact with a pawl lifter, coupled to the latch pawl, thereby allowing the claw to rotate to its open position. The side door latch also consists of a cinch override lever which allows the cancellation of the cinching function at any time of the cinching travel by interacting with a cinch override clutch lever, and in turn with a cinch override clutch link which is attached to both, the pawl release lever and the cinch override clutch lever. These interactions within the latch will allow the disengagement of the cinch drive link from the latch claw.

12 Claims, 14 Drawing Sheets

(51) Int. Cl.
*E05B 81/20* (2014.01)
*E05B 81/90* (2014.01)

(58) Field of Classification Search
CPC .......... E05B 81/26; E05B 81/28; E05B 81/30; E05B 81/34; E05B 81/66; E05B 81/68; E05B 81/90; E05B 85/20; E05B 85/24; E05B 85/26; E05B 79/20; Y10T 292/1047; Y10T 292/1082; Y10S 292/23
See application file for complete search history.

(56) References Cited

U.S. PATENT DOCUMENTS

| | | | | |
|---|---|---|---|---|
| 9,903,143 | B2 * | 2/2018 | Hiramoto | E05B 81/68 |
| 10,125,524 | B2 * | 11/2018 | Kouzuma | E05B 81/14 |
| 10,329,806 | B2 * | 6/2019 | Scholz | E05B 77/08 |
| 10,378,252 | B2 * | 8/2019 | Ottino | E05B 81/68 |
| 10,480,224 | B2 | 11/2019 | Wilkes et al. | |
| 11,180,934 | B2 * | 11/2021 | Ney | E05B 81/90 |
| 2007/0267169 | A1 | 11/2007 | Acre | |
| 2015/0123407 | A1 | 5/2015 | Wikes et al. | |
| 2019/0017301 | A1 * | 1/2019 | Cumbo | E05B 81/20 |
| 2020/0224465 | A1 | 7/2020 | Nagaoka et al. | |
| 2021/0230911 | A1 * | 7/2021 | Weichsel | E05B 81/20 |
| 2021/0277689 | A1 * | 9/2021 | Sturm | E05B 85/243 |
| 2021/0372169 | A1 * | 12/2021 | Patane | E05B 81/30 |

OTHER PUBLICATIONS

Search Report dated May 25, 2023; FR Application No. 2108520, 1 page.
Written Opinion dated May 25, 2023; FR Application No. 2108520, 6 pages (non-English).
Office Action dated Jul. 21, 2023; Sweden Application No. 2150986-4; 4 pages.

* cited by examiner

SIDE DOOR LATCH

CROSS REFERENCE TO RELATED APPLICATIONS

The present application claims priority to the following U.S. Provisional patent applications: U.S. Ser. No. 63/194,980 filed on May 29, 2021; and U.S. Ser. No. 63/061,563 filed on Aug. 5, 2020, the entire contents each of which are incorporated herein by reference thereto.

BACKGROUND

Exemplary embodiments of the present disclosure pertain to the art of vehicle latches.

Since technology has a big impact in the industry which includes automotive line, the interface between vehicle and people are also changing. For that reason there is a need for improvement in the latches for the way a person interacts with the door at the moment when they will close it and they will open it.

BRIEF DESCRIPTION

A remote cinching actuator consisting of an integral motor, a built-in switch and a two stage gear drive system coupled to a cable lever mechanically attached to the latch by a cable for performing cinching function.

A vehicle side door latch, with power release, cinching and override capabilities. Power release mechanism consists of an integral motor, wherein the motor rotation in one direction will drive the power release gear and the power release lever, thus allowing the movement of a pawl release lever which will in turn make contact with the pawl lifter that is coupled to the pawl, thereby releasing the claw from primary position to rotate freely to its open position. The cinching mechanism is comprised of a cinching lever joined by a cable to a cinching actuator. The lever moves the cinch link drive which is also attached to a bearing that will travel through the canal of a cinch override lever and continuing with the cinching travel path to interact with the claw so that it can rotate on its pivot from secondary to primary position. The cinch override function is therefore a means to cease the cinching operation at any time of the cinching travel and upon vehicle battery loss, and is comprised of a cinch override lever which interacts with a cinch override clutch lever, coupled to a cinch override link which is also joined to a pawl release lever, therefore permitting the detachment of the drive link from the latch claw. Notably, inside and outside manual release levers will allow the override function whether the latch is cinching or not.

In addition to one or more of the features described above, or as an alternative to any of the foregoing embodiments, both the vehicle side door latch and remote cinching actuator further comprise integrated switches.

In addition to one or more of the features described above, or as an alternative to any of the foregoing embodiments the vehicle cinch latch further comprises integrated switches that communicate to a vehicle body controller to identify functional positions of the latch claw, the latch pawl, and the cinch/release mechanism.

DETAILED DESCRIPTION

A detailed description of one or more embodiments of the disclosed apparatus and method are presented herein by way of exemplification and not limitation with reference to the Figures.

Referring now to the attached FIGS., a side door latch 10 with power release, cinching and override capabilities and a remote cinching actuator 40 are disclosed herein.

Figure 7A:
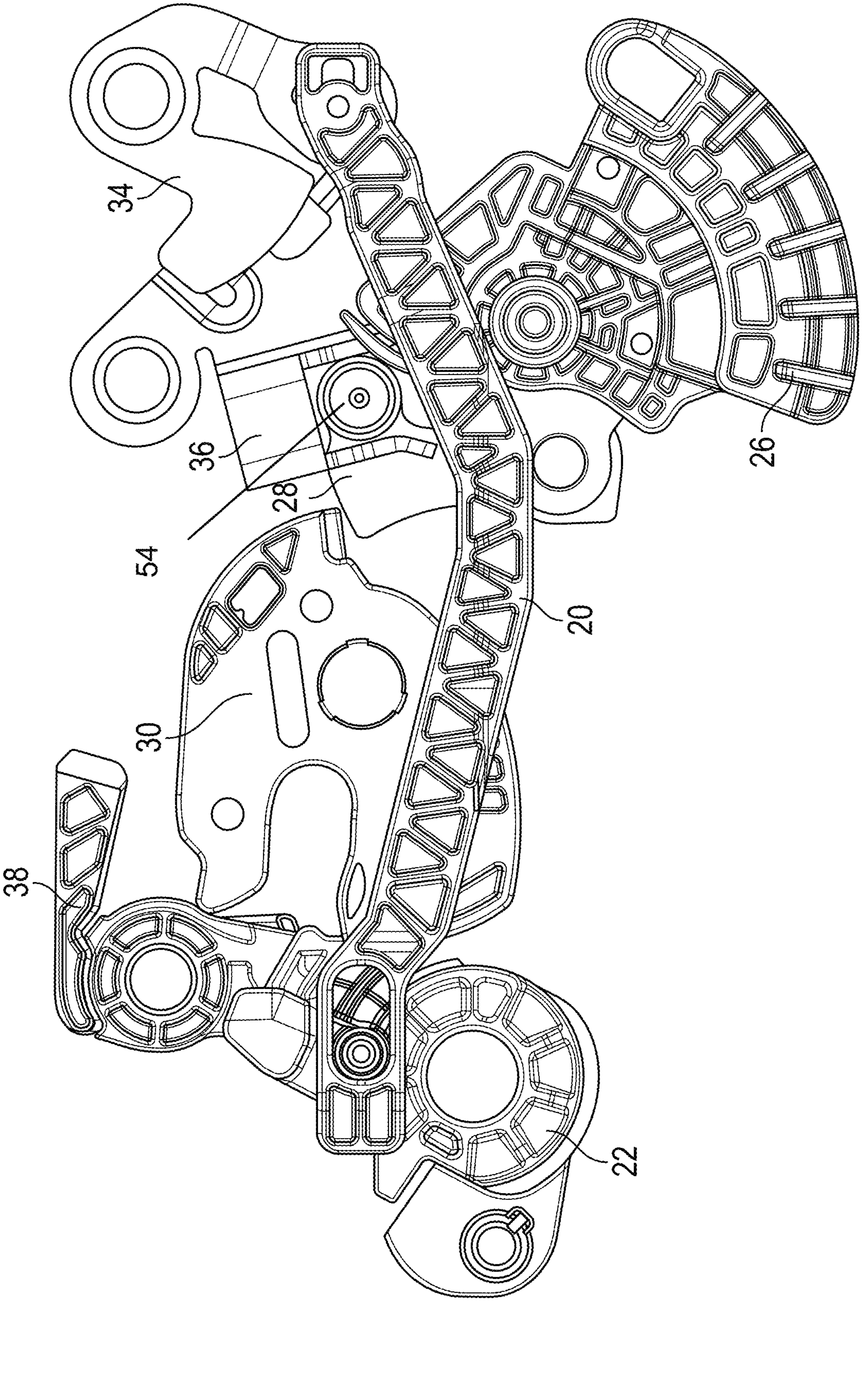
FIGS. 7A and 7B illustrate a cinch override manual release of a latch according to the present disclosure.
Figure 7B:
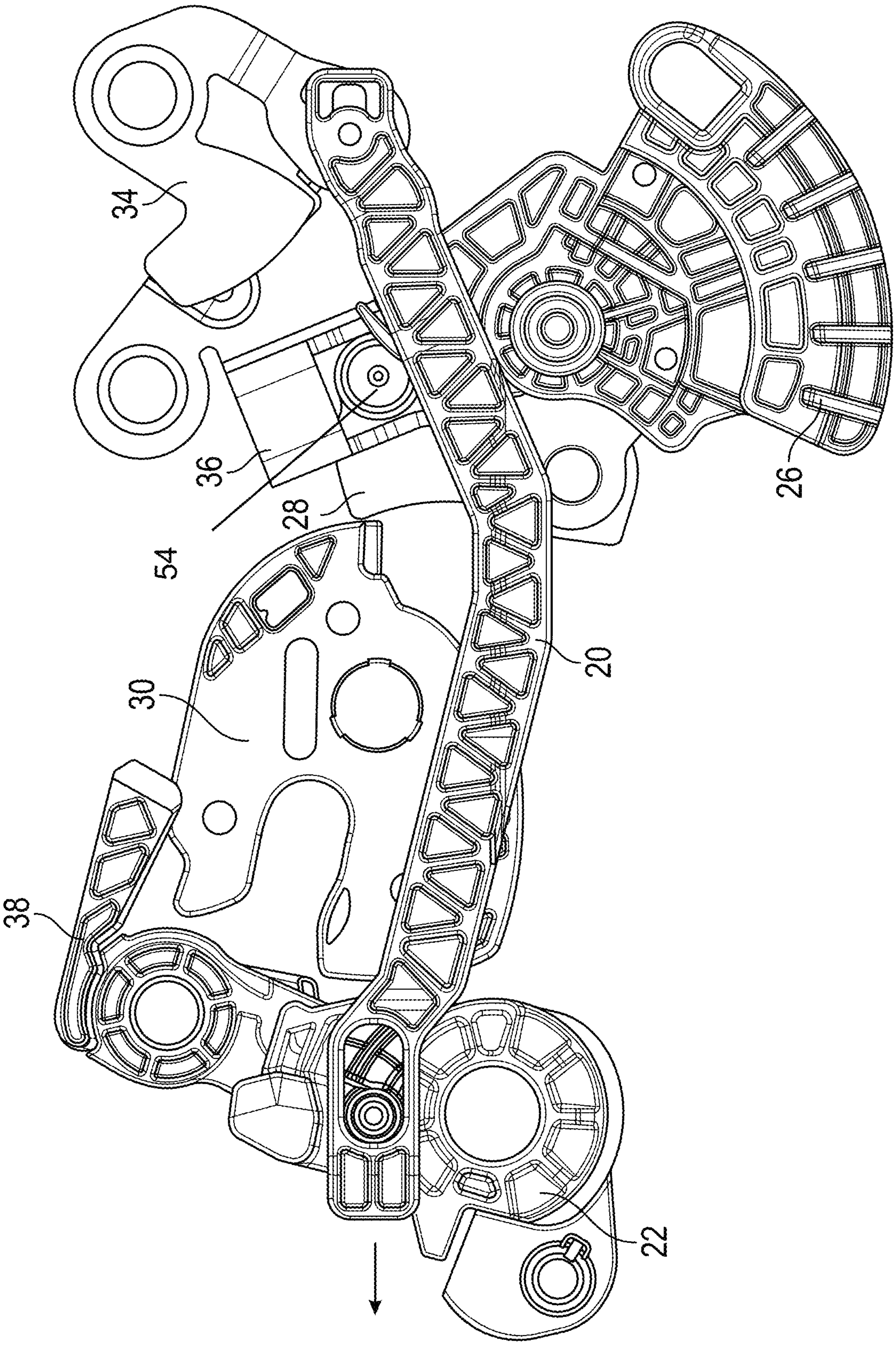

The side door latch 10 has a cinch override function (See FIGS. 7A-7B) and an inside and outside service release for manual operation, which also serve as an emergency release in the event of battery loss. Side door latch 10 functions electrically with the remote cinching actuator 40. Cinching actuator 40 uses an integrated motor 52 where its rotation drives two-stage drive gears 44, 46 that are coupled to a cable lever 42 connected by a cable 48 to the cinching lever 26 within the side door latch 10. The cinching lever 26 moves the cinch drive link 28, which is joined to a bearing 54 that will travel through a canal of the cinch lever 36 to maintain the cinching course and of the cinch drive link 28 that will move the claw 30, hence, allowing the latch claw 30 to rotate freely on its axes to its closed/primary position.

Figure 1:
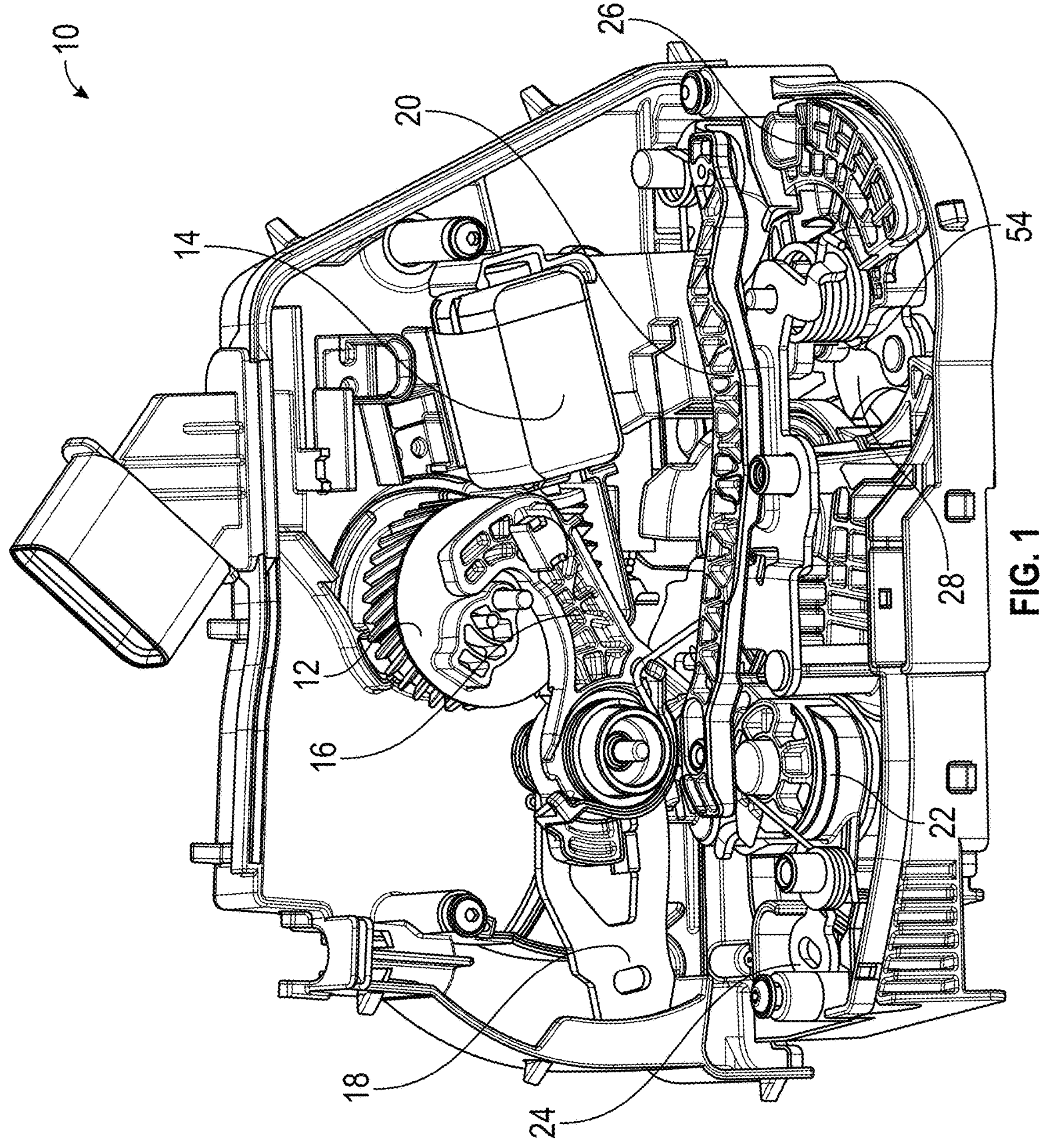
FIG. 1 is a schematic illustration of a latch according to the present disclosure.
Figure 2:
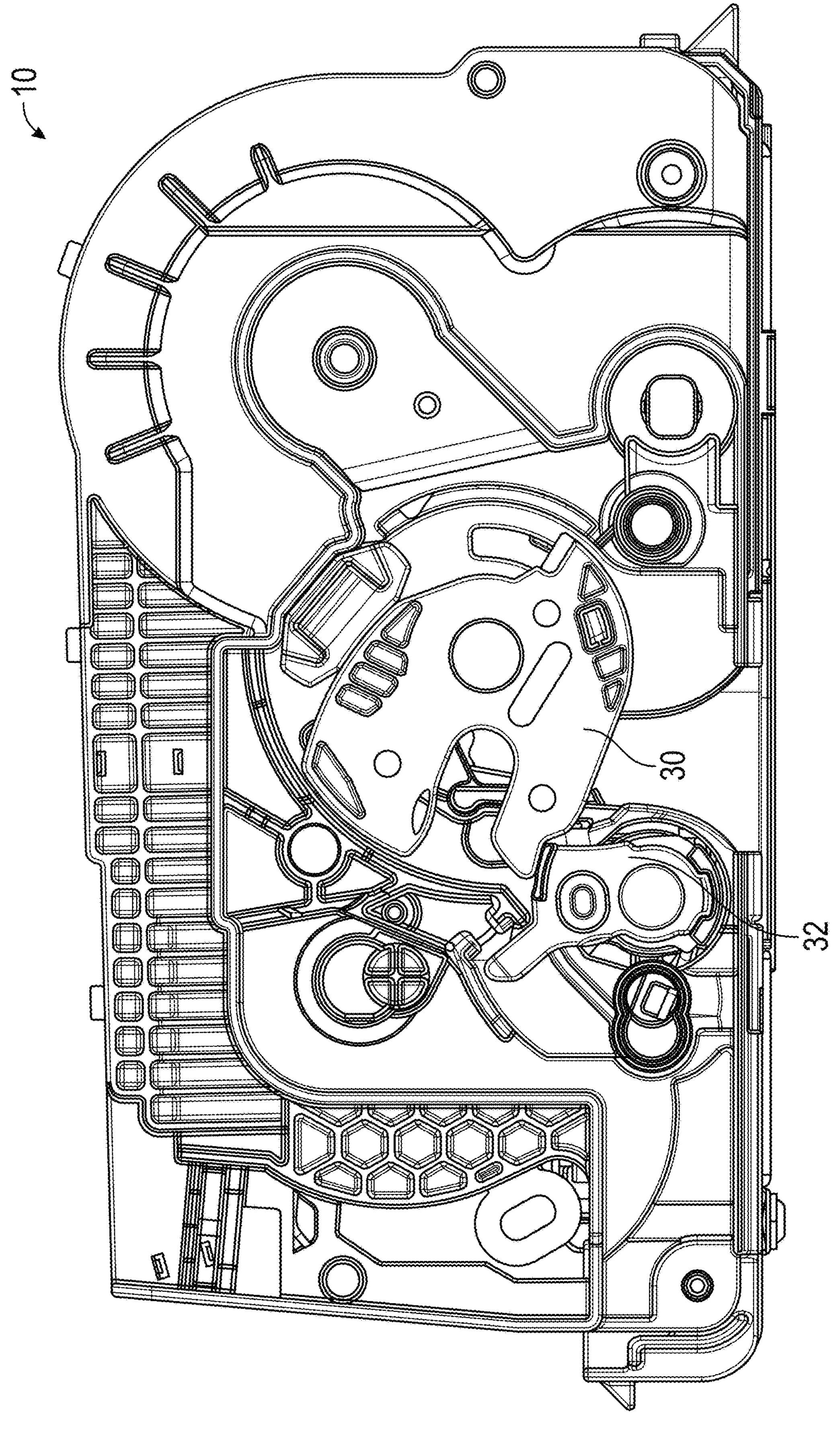
FIG. 2 illustrates components a latch according to the present disclosure.
Figure 3:
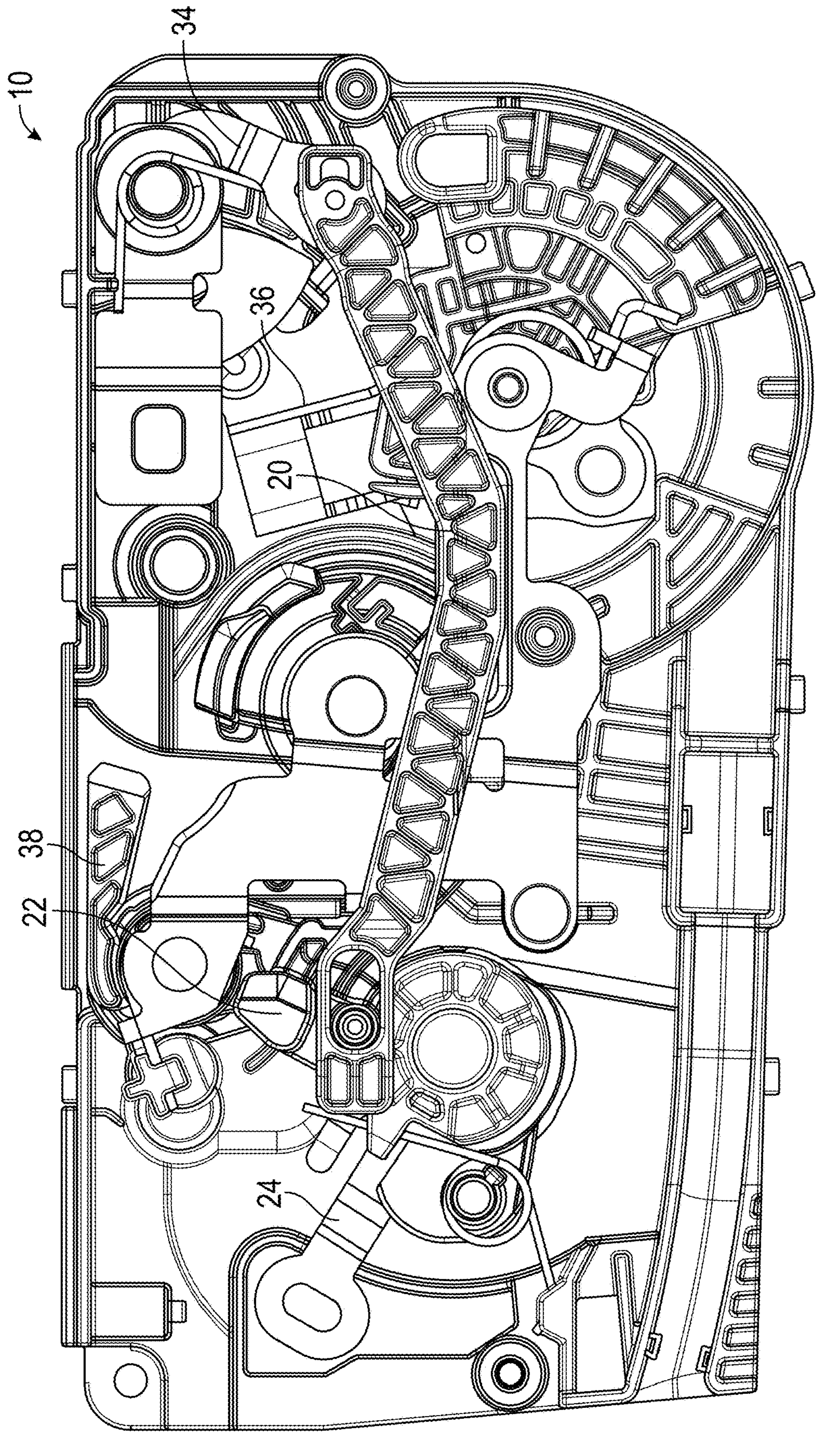
FIG. 3 illustrates components a latch according to the present disclosure.
Figure 4:
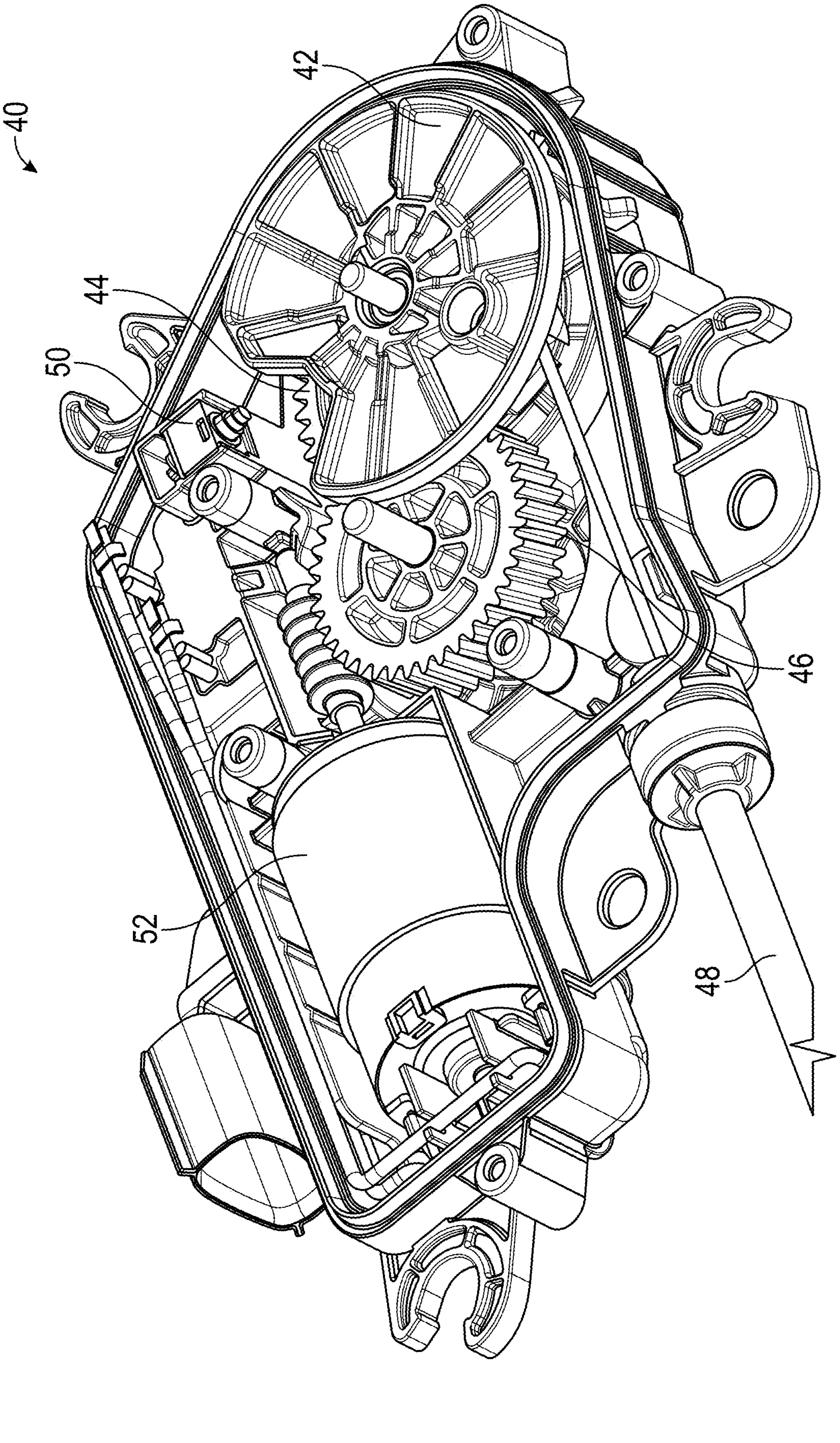
FIG. 4 is a schematic illustration of the remote cinch actuator according to the present disclosure.
Figure 5A:
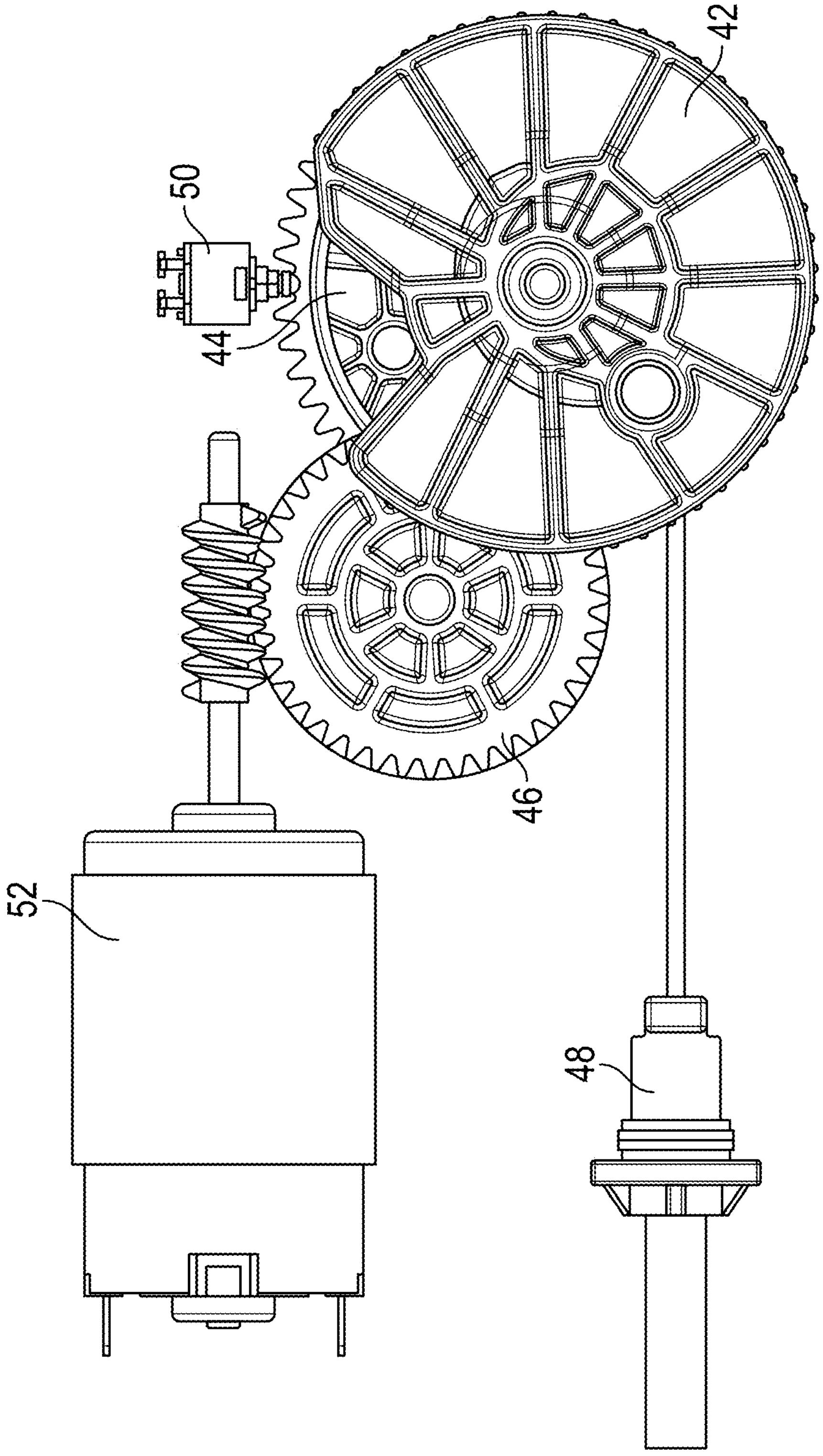
FIGS. 5A-5D illustrates the start and complete of the cinch function of a latch according to the present disclosure.
Figure 5B:
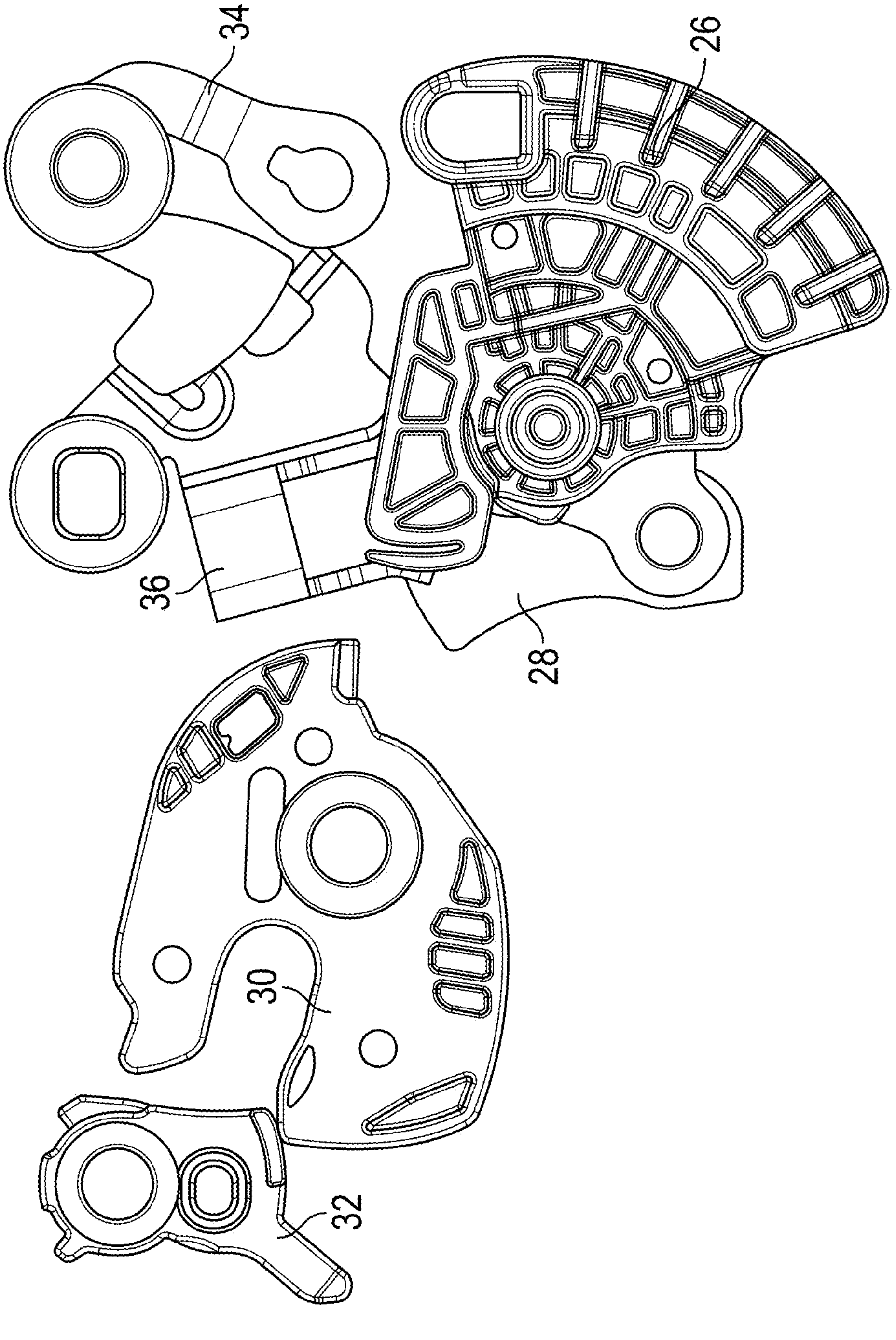
Figure 5C:
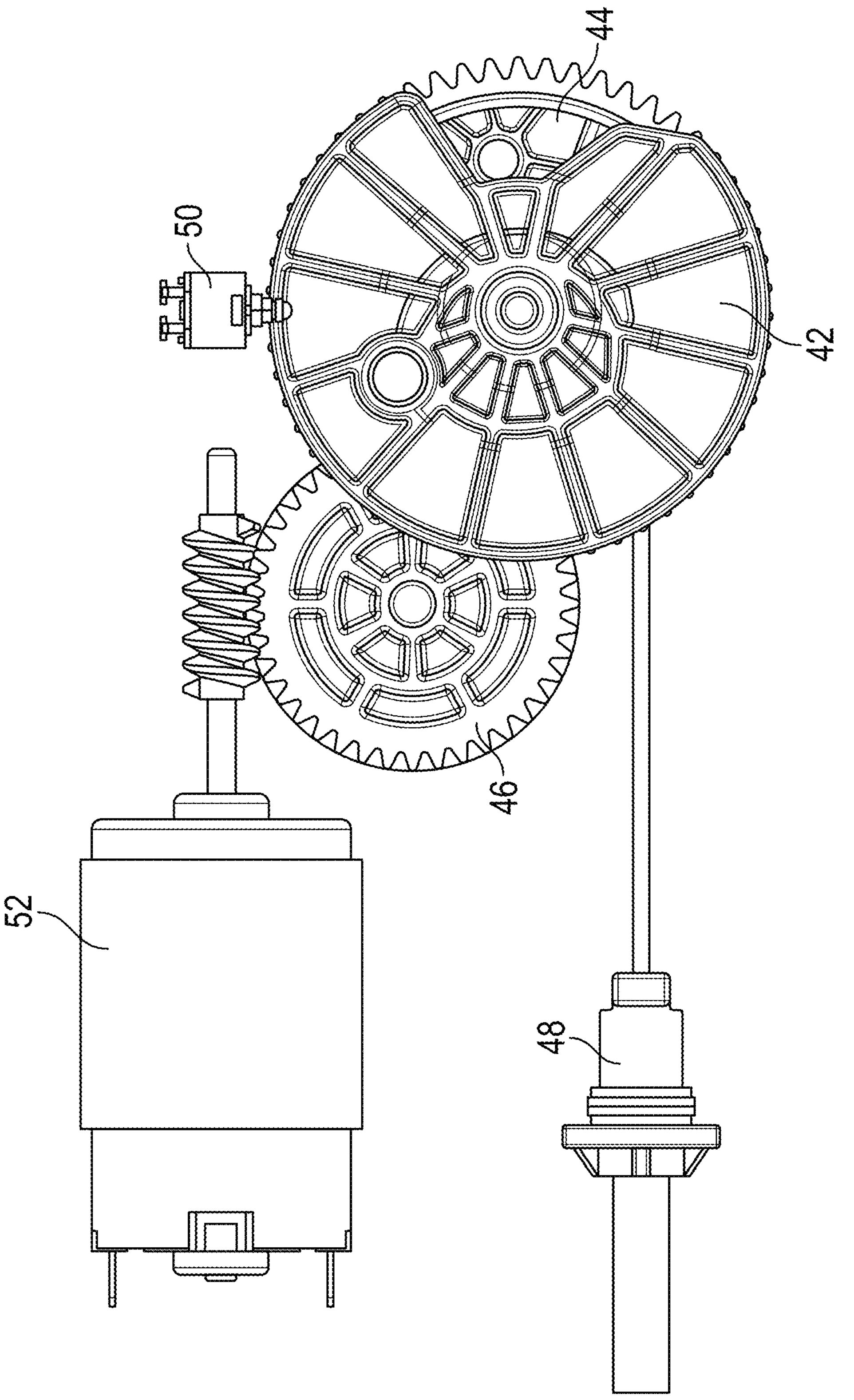
Figure 5D:
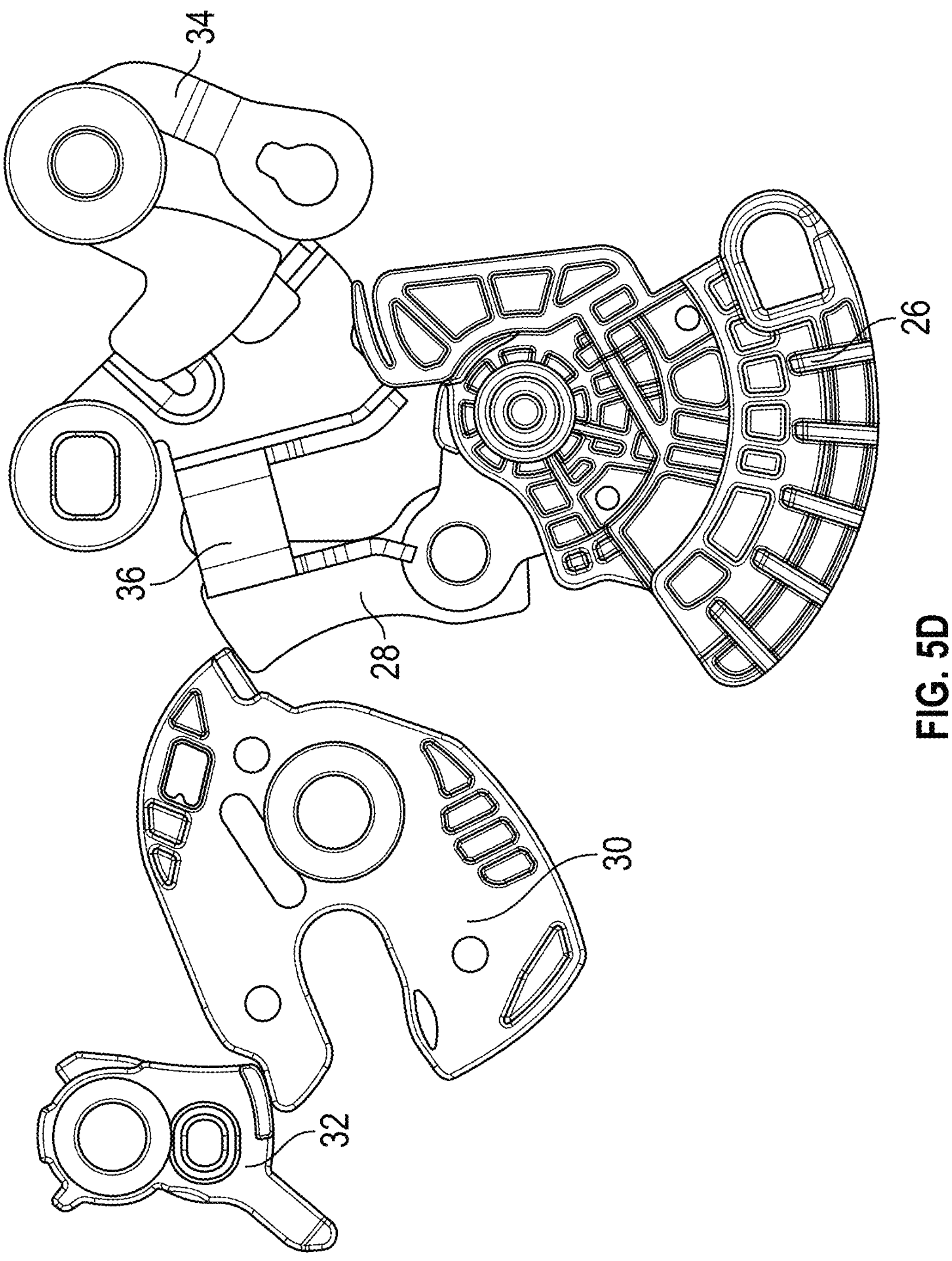
Figure 6B:
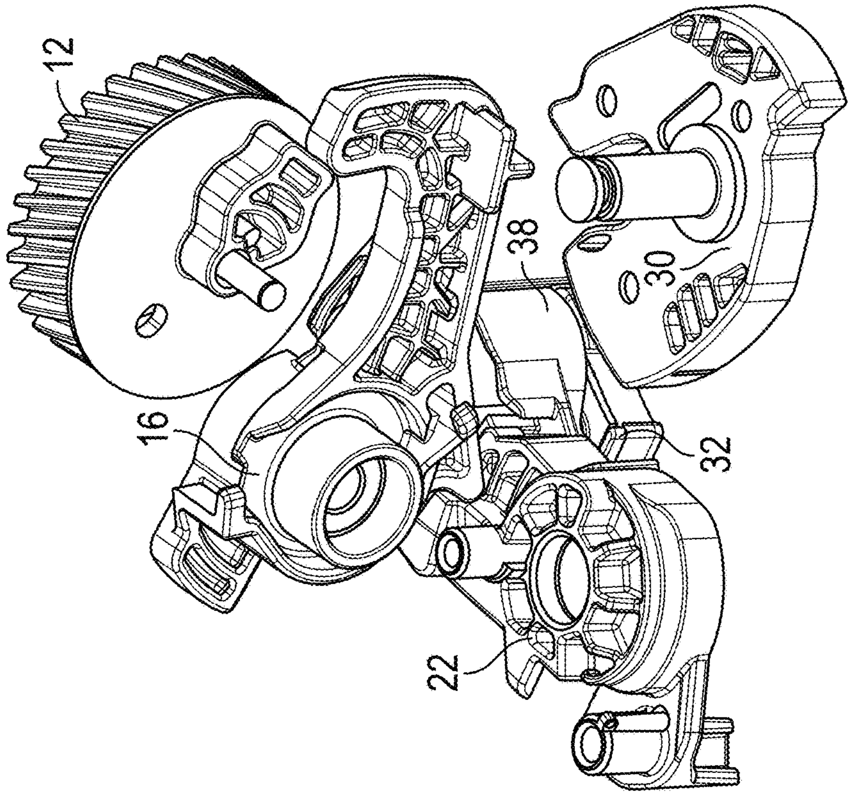
FIGS. 6A and 6B illustrate a power release function (latch and unlatched) of a latch according to the present disclosure.
Figure 6A:
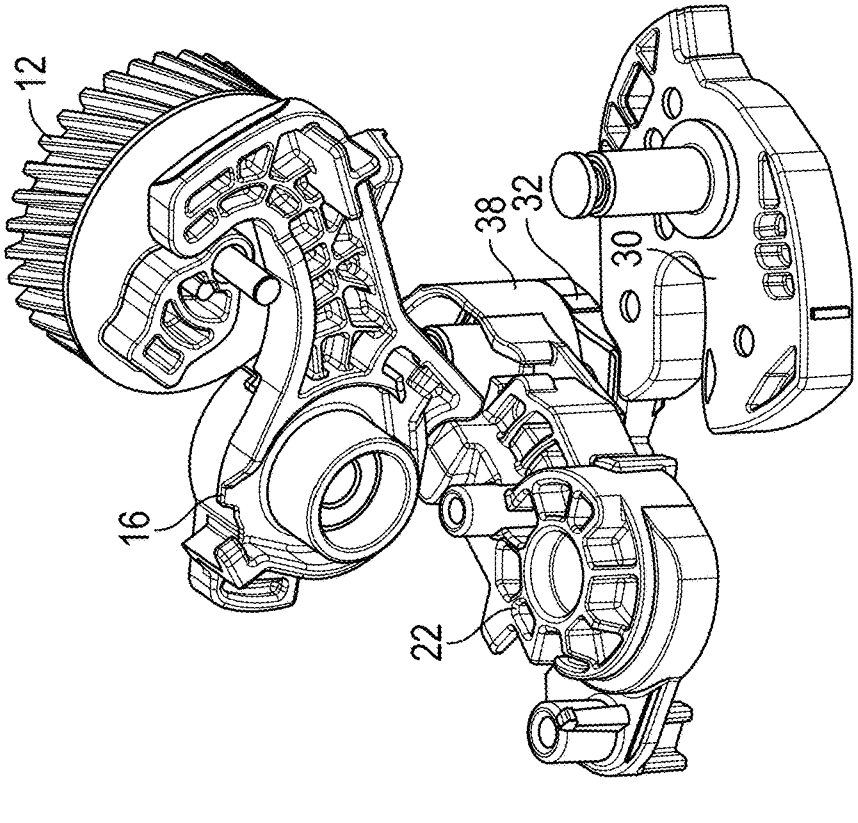

The side door latch 10 contains the capability to electrically release (See FIGS. 6A-6B) the vehicle door without the need of manual means via a cable as this mechanism contains a motor 14 that rotates a power release gear 12, and consequently a power release lever 16 moves and contacts the pawl release lever 22, which in turn moves the pawl lifter 38 that is coupled to the latch pawl 32, thereby allowing the claw 30 to rotate on its pivot to its open position.

Furthermore, side door latch 10 contains a cinch override lever 36 to stop the cinching operation (See FIGS. 5A-5D) in the event of power loss or at any time on throughout the cinching travel. The cinch override lever 36 functions by interacting with the cinch override clutch lever 34. This allows the movement of the cinch override clutch link 20 which is joined to both the cinch override clutch lever 34 and the pawl release lever 22. These interactions result in the disengagement of the cinch drive link 28 from the latch claw 30. Manual service release, inside or outside 18, 24, as well as power release (See FIGS. 6A-6B), will use the cinch override lever 36 to release the latch 10 whether it's cinching or not.

Figure 8A:
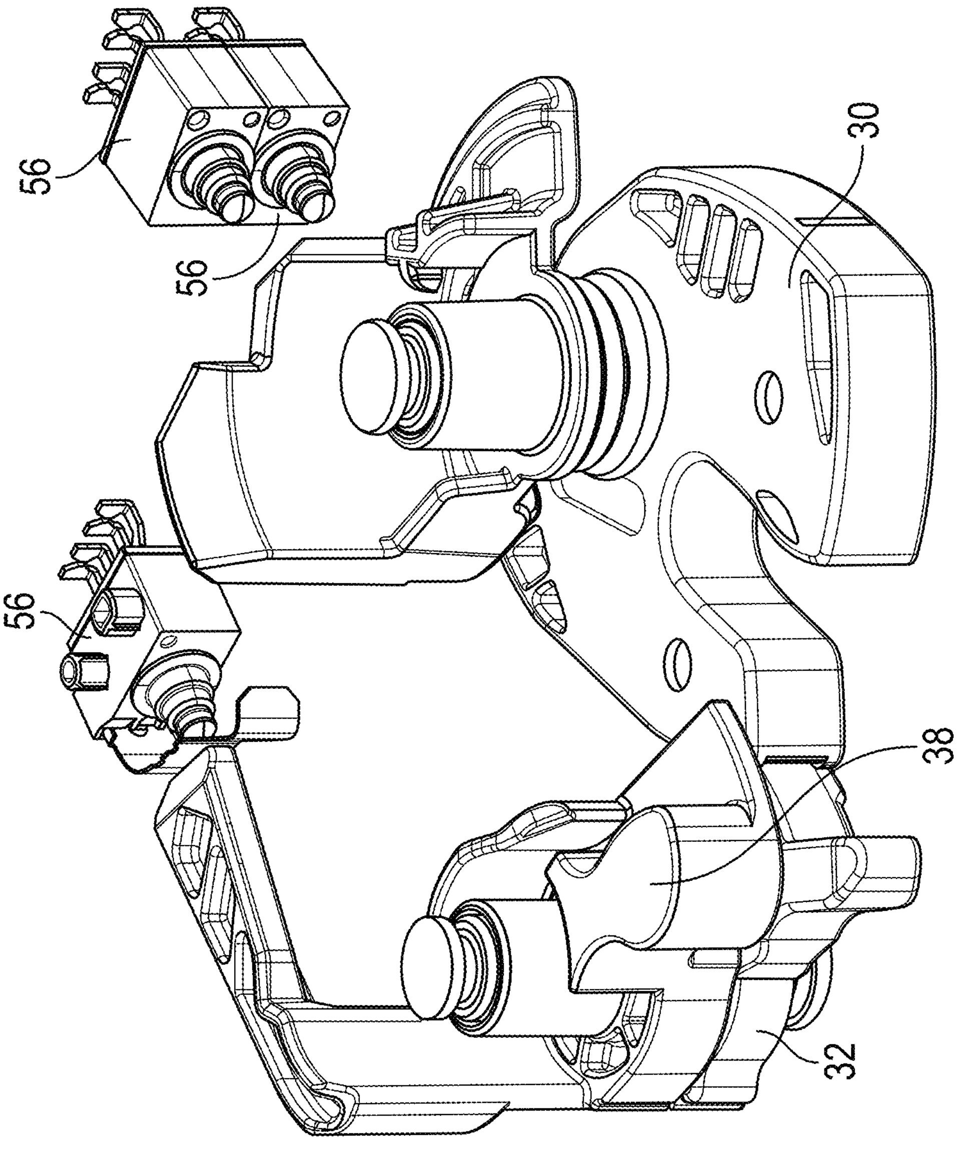
FIGS. 8A and 8B illustrate the location of switches of a latch and remote cinch actuator according to the present disclosure.
Figure 8B:
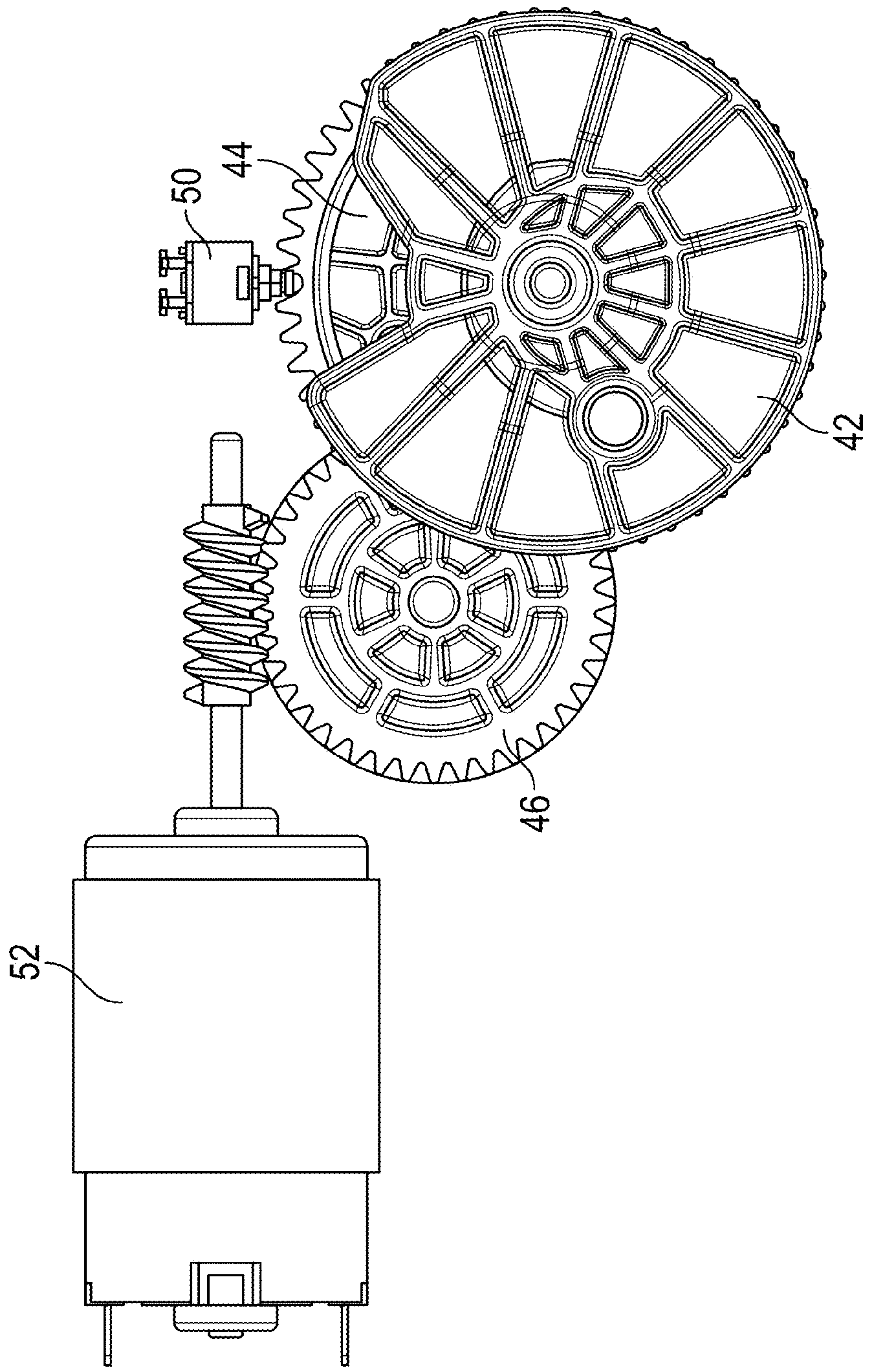
Figure 9B:
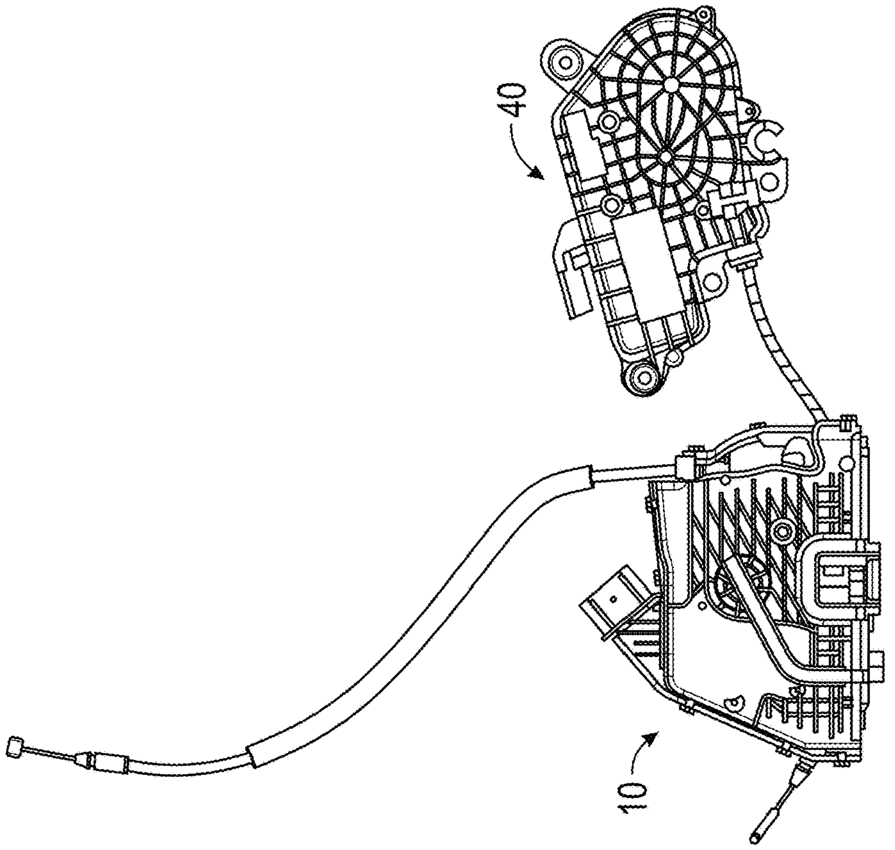
FIGS. 9A and 9B are views illustrating a latch and a remote cinch actuator according to the present disclosure.
Figure 9A:
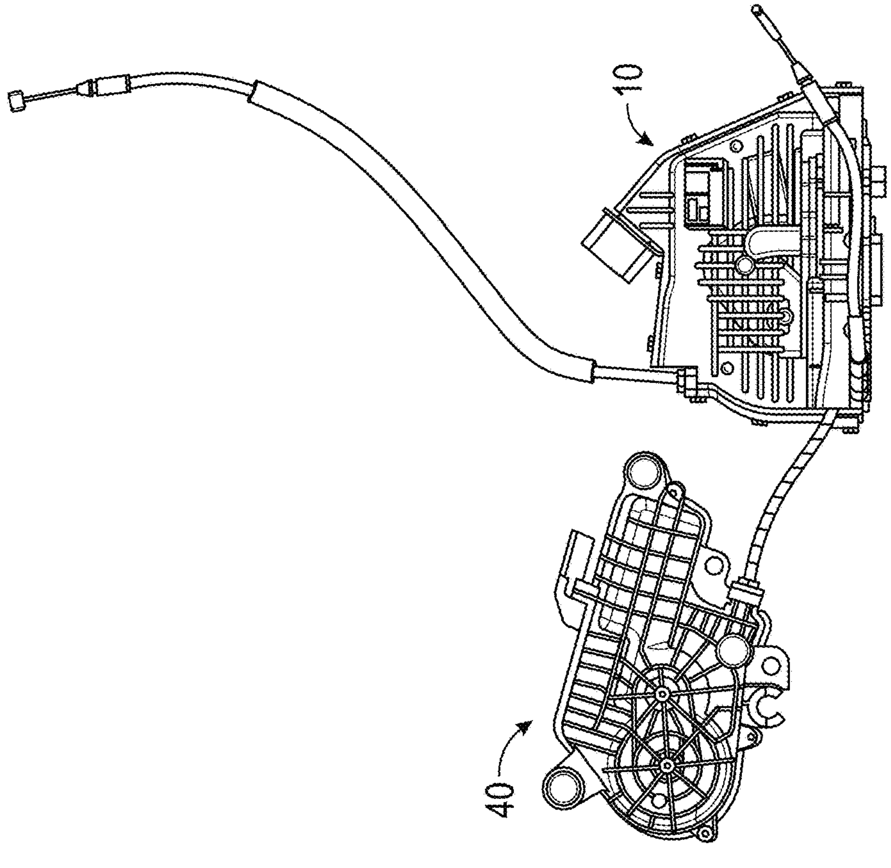

In addition, integrated switches (See FIGS. 8A-8B) within the side door latch 10 will communicate to a vehicle body controller to identify functional positions of the selected levers (pawl 32, claw 30, cinch/release mechanism).

An integrated switch 50 will communicate to a vehicle body controller to recognize the functional position of the cinching mechanism within the remote cinching actuator 40.

Inside manual release lever 18 is operably coupled to an inside handle of a vehicle the latch 10 is secured to. Outside manual release lever 24 is operably coupled to an outside handle of the vehicle the latch 10 is secured to. In one non-limiting embodiment of the present disclosure, the power release lever 16, the inside manual release lever 18 and the outside manual release lever 24 are each operable coupled to the pawl release lever 22 such that their movement in certain operations moves the pawl lifter 38 that is coupled to the latch pawl 32, thereby allowing the claw 30 to rotate on its pivot to its open position.

Disclosed herein is a side door latch that was developed with the purpose to get a new generation of latches and contains a several power and manual operations in the same product with it being versatile to operate it mainly electrical but also with a manual operation as a backup when it need it.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vehicle side door latch, comprising:

a remote cinching actuator;

a cinching motor located within the remote cinching actuator; and a two-stage gear train system located within the remote cinching actuator and for performing a cinching function of the vehicle side door latch, wherein rotation of the cinching motor drives a driver gear and a driven gear, the driven gear is coupled to a cable lever mechanically attached by a cable, to a cinching lever within the vehicle side door latch, the cinching lever when moved by the cable will move a cinch drive link which is in turn attached to a bearing, that will move along with the cinch drive link, and the bearing will travel through a canal of a cinch override lever, which maintains a cinching travel course of the cinch drive link and allows an engagement of the cinch drive link with a claw of the vehicle side door latch in order to rotate the claw on its axis from a secondary position to a primary position;

a release motor embedded within the side door latch, wherein rotation of the release motor will drive a power release gear, and consequently, through a cam on the power release gear, a power release lever will be driven which will when driven will cause movement of a pawl release lever that will contact a pawl lifter, coupled to a pawl, thereby permitting the claw to rotate freely to its open position; and a cinch override clutch link, for ceasing of the cinching function of the vehicle side door latch at any time during the cinching function;

a cinch override clutch lever that interacts with the cinch override lever, the cinch override clutch lever is coupled to the cinch override clutch link at one end of the cinch override clutch link, and the cinch override clutch link is also joined to the pawl release lever at an opposite end of the cinch override clutch link, wherein movement of the cinch override clutch link by the pawl release lever causes disengagement of the cinch drive link from the claw; and an inside manual release lever and an outside manual release lever each operably coupled to the pawl release lever, which allows for overriding of the cinching function whether the vehicle side door latch is cinching or not.

2. The vehicle side door latch as in claim 1, further comprising integrated switches.

3. The vehicle side door latch as in claim 2, wherein the integrated switches communicate to a vehicle body controller to identify functional positions of the claw and the pawl.

4. The vehicle side door latch as in claim 1, wherein the remote cinching actuator further comprises one integrated switch.

5. The vehicle side door latch as in claim 4, wherein the integrated switch communicates to a vehicle body controller to identify a functional position of a cinching mechanism within the remote cinching actuator.

6. The vehicle side door latch as in claim 5, further comprising integrated switches that communicate to the vehicle body controller to identify functional positions of the claw and the pawl.

7. A vehicle side door latch, comprising:

a cinch override clutch link, for ceasing of a cinching function of the vehicle side door latch at any time during the cinching function;

a cinching lever for driving a cinch drive link which is attached to a bearing, that will move along with the cinch drive link, and the bearing will travel through a canal of a cinch override lever, which maintains a cinching travel course of the cinch drive link and allows an engagement of the cinch drive link with a claw of the vehicle side door latch in order to rotate the claw on its axis from a secondary position to a primary position;

a cinch override clutch lever that interacts with the cinch override lever, the cinch override clutch lever is coupled to the cinch override clutch link at one end of the cinch override clutch link, and the cinch override clutch link is also joined to a pawl release lever at an opposite end of the cinch override clutch link, wherein movement of the cinch override clutch link by the pawl release lever causes disengagement of the cinch drive link from the claw, wherein the cinch override clutch link extends from the pawl release lever across the claw and to the cinch override clutch lever, the pawl release lever and the cinch override clutch lever being located on opposite sides of the claw; and an inside manual release lever and an outside manual release lever each operably coupled to the pawl release lever, which allows for overriding of the cinching function whether the vehicle side door latch is cinching or not.

8. The vehicle side door latch as in claim 7, further comprising:

a motor located within the side door latch, wherein rotation of the motor will drive a power release gear, and consequently, through a cam on the power release gear, a power release lever will be driven which will when driven will cause movement of the pawl release lever that will contact a pawl lifter, coupled to a pawl, thereby permitting the claw to rotate freely to its open position.

9. The vehicle side door latch as in claim 8, further comprising:

a remote cinching actuator operably coupled to the vehicle side door latch by a cable and the remote cinching actuator causing the cinching function of the vehicle side door latch.

10. The vehicle side door latch as in claim 7, further comprising:

a remote cinching actuator operably coupled to the vehicle side door latch by a cable and the remote cinching actuator causing the cinching function of the vehicle side door latch.

11. A method for ceasing a cinching function of a vehicle side door latch at any time during the cinching function, comprising:

moving a cinch override clutch link via movement of a pawl release lever operably coupled to the cinch override clutch link at one end of the cinch override clutch link; and disengaging a cinch drive link from a claw of the vehicle side door latch when an override clutch link lever operably coupled to an opposite end of the cinch override clutch link is moved by the pawl release lever, wherein the cinch override clutch link extends from the pawl release lever across the claw and to a cinch override clutch lever, the pawl release lever and the cinch override clutch lever being located on opposite sides of the claw, wherein a cinching lever for driving the cinch drive link which is attached to a bearing, that will move along with the cinch drive link, and the bearing will travel through a canal of a cinch override lever, which maintains a cinching travel course of the cinch drive link and allows engagement of the cinch drive link with the claw of the vehicle side door latch in order to rotate the claw on its axis from a secondary position to a primary position, and wherein an inside manual release lever and an outside manual release lever each operably coupled to the pawl release lever, which allows for overriding of the cinching function whether the vehicle side door latch is cinching or not.

12. A method for ceasing a cinching function of a vehicle side door latch at any time during the cinching function, comprising:

moving a cinch override clutch link via movement of a pawl release lever operably coupled to the cinch override clutch link at one end of the cinch override clutch link; and disengaging a cinch drive link from a claw of the vehicle side door latch when an override clutch link lever operably coupled to an opposite end of the cinch override clutch link is moved by the pawl release lever, wherein the cinch override clutch link extends from the pawl release lever across the claw and to a cinch override clutch lever, the pawl release lever and the cinch override clutch lever being located on opposite sides of the claw, wherein a cinching lever for driving the cinch drive link which is attached to a bearing, that will move along with the cinch drive link, and the bearing will travel through a canal of a cinch override lever, which maintains a cinching travel course of the cinch drive link and allows engagement of the cinch drive link with the claw of the vehicle side door latch in order to rotate the claw on its axis from a secondary position to a primary position.

* * * * *